United States Patent [19]

Ballocca et al.

[11] Patent Number: 4,531,326
[45] Date of Patent: Jul. 30, 1985

[54] EXTRUDED WEATHER STRIP FOR MOTOR VEHICLE BODIES AND AN EXTRUSION HEAD FOR FORMING THE WEATHER STRIP

[75] Inventors: Guido Ballocca; Roberto Azzola, both of Turin, Italy

[73] Assignee: S.A.I.A.G. S.p.A., Italy

[21] Appl. No.: 568,566

[22] Filed: Jan. 6, 1984

[30] Foreign Application Priority Data

Jan. 6, 1983 [IT] Italy ................................ 67009 A/83

[51] Int. Cl.³ .......................... E06B 7/16; B28B 21/52
[52] U.S. Cl. ...................................... 49/497; 425/465; 425/466
[58] Field of Search ................ 49/497, 498; 425/466, 425/465

[56] References Cited

U.S. PATENT DOCUMENTS

| | | | |
|---|---|---|---|
| 3,038,218 | 6/1962 | Swaneck, Jr. et al. ............... | 49/497 |
| 4,042,741 | 8/1977 | Bright .............................. | 49/497 X |
| 4,067,146 | 1/1978 | Mesnel et al. ..................... | 49/498 X |
| 4,281,978 | 8/1981 | Shigematsu ...................... | 425/465 X |
| 4,411,941 | 10/1983 | Azzola .............................. | 49/498 X |

Primary Examiner—Philip C. Kannan
Attorney, Agent, or Firm—Sughrue, Mion, Zinn, Macpeak, and Seas

[57] ABSTRACT

The weather strip is intended to be applied to the edge of an aperture or closure element of the body of a motor vehicle and comprises an anchoring section of elastomeric material with a channel section, and a tubular sealing section also of elastomeric material coextruded with the anchoring section. In the portions of the weather strip intended to be applied to corner portions of the edge of the aperture or closure element, or to portions of the edge close to which there are obstacles, the tubular sealing section is curved relative to the anchoring section and is connected to the anchoring section along a curved line.

The invention also relates to an extrusion head for extruding a weather strip of the said type.

4 Claims, 15 Drawing Figures

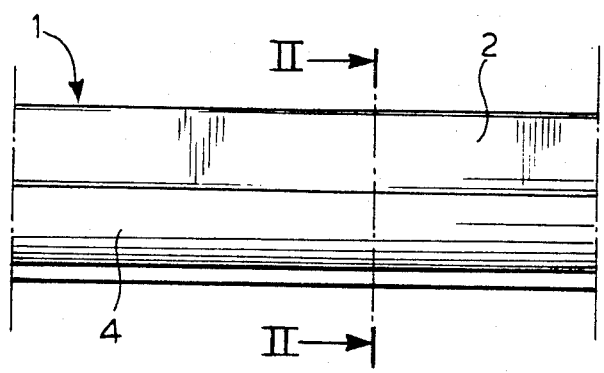
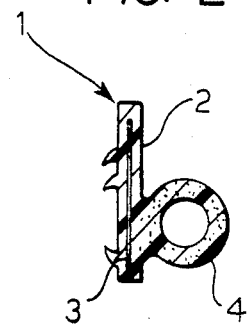
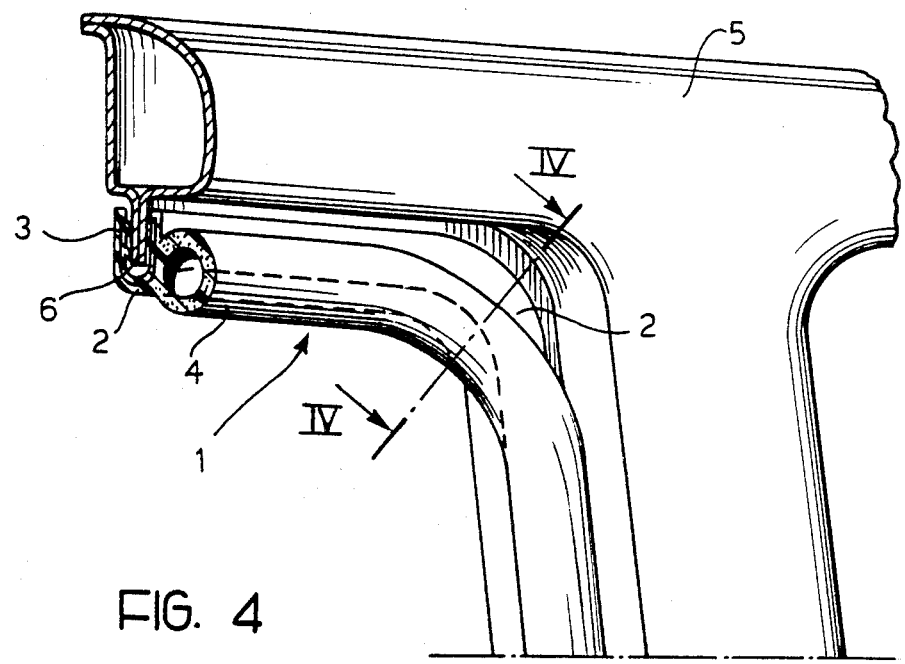
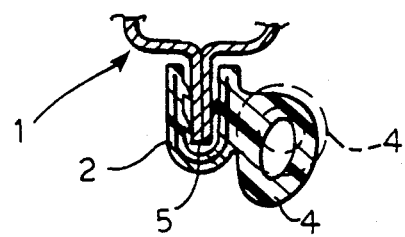

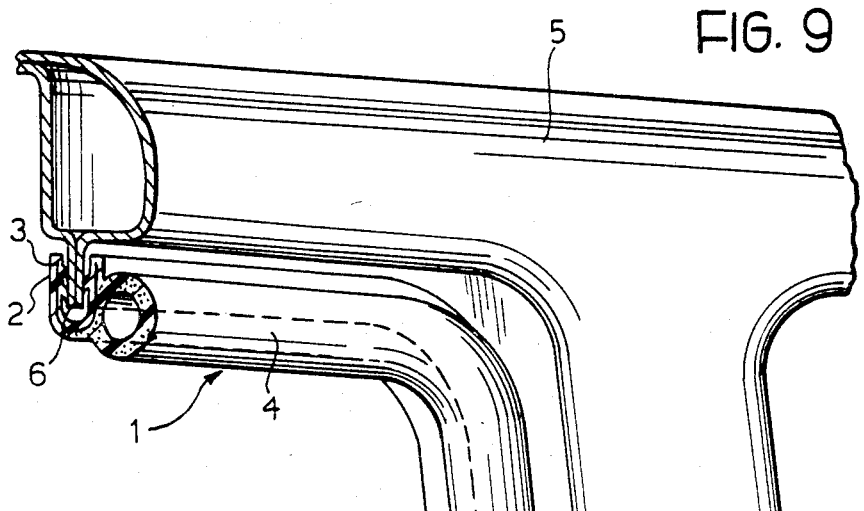
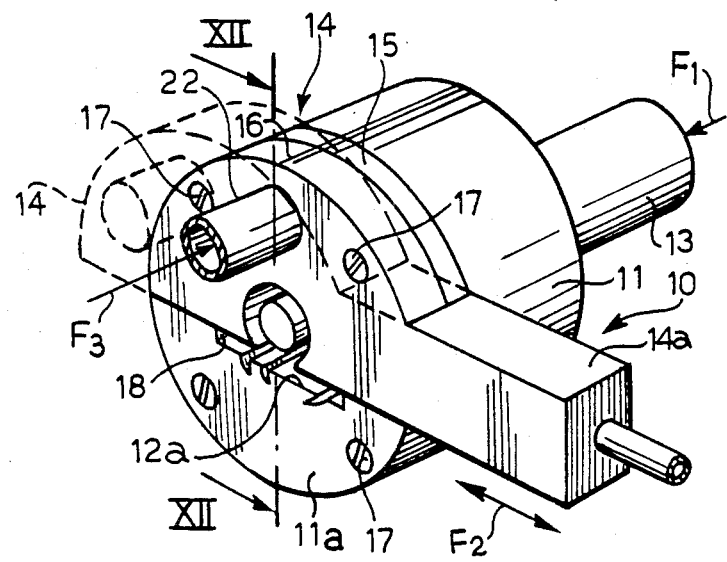

EXTRUDED WEATHER STRIP FOR MOTOR VEHICLE BODIES AND AN EXTRUSION HEAD FOR FORMING THE WEATHER STRIP

The present invention relates to a weather strip for the edge of an aperture or closure element for the body of a motor vehicle, and in particular to a weather strip of the type comprising an anchoring section of elastomeric material and a tubular sealing section also of elastomeric material coextruded with the anchoring section.

The invention relates particularly to a weather strip of the type defined above for an edge which has critical zones for the application of the weather strip.

The expression "critical zone" refers, for example, to corner portions with small radii of curvature, or portions of the edge immediately adjacent an obstacle, as will be better explained below.

Generally, weather strips of the said type are provided with a core of metallic material embedded in the anchoring section during the extrusion. This metallic core is usually a strip element fed to an extrusion head together with the elastomeric material to be extruded. After extrusion, the weather strips of conventional type have the form shown, for example, in FIGS. 1 and 2 of the appended drawings. In these Figures, a length of weather strip is generally indicated 1 and comprises a flattened anchoring section 2 of solid elastomeric material, in which a metal core 3 is embedded and to which is connected a tubular sealing section 4, for example, of cellular elastomeric material, coextruded with the anchoring section 2. At the outlet from the extrusion head, the weather strip 1 is straight and, in particular, the sealing section 4 is also straight and is connected to the anchoring section 2 along a substantially straight line.

After the extrusion, and before being put into use, the anchoring section 2 is bent into a channel section. In use, the weather strip is applied to the edge of an aperture, for example, to the edge of an aperture for access to the body of a motor vehicle, with the anchoring section gripping this edge as shown schematically in FIG. 3. This Figure shows part of an aperture in a body 5 of a motor vehicle to the edge 6 of which is applied a weather strip 1 of the conventional type described above. More particularly, in FIG. 3, a corner portion of the edge of an aperture is shown. As is seen in this Figure, in the corner portion of the aperture, the anchoring section of a weather strip is well able to adapt itself to the angled course of the edge of the aperture. The tubular sealing section 4, which is rather more elastic, tends to deform in the corner zone in the manner illustrated in FIG. 4. As is seen from this Figure, in the corner zone, the tubular section 4 tends to flatten and "fall", that is, to follow the curve of the edge of the aperture with a greater radius of curvature than the radius of curvature of this edge. FIG. 4 shows in broken outline the ideal position of the tubular sealing section in the corner region.

As a result of the deformation described above, the tubular sealing section 4 may not ensure a perfect seal in the corner zone of the aperture. Moreover, the weather strip of the conventional type described above is also unsatisfactory from an aesthetic point of view, in that the tubular sealing section does not follow the edge of the aperture perfectly in the corner zone.

There are similar disadvantages when the conventional weather strips described above are anchored to the edge of a closure element (door) associated with an aperture in the body of a vehicle.

FIG. 5 shows a weather strip of the said known type applied to the edge of a rear aperture of a motor vehicle with a two-bay body, this aperture being provided with a hatch 8 hinged at its upper edge to the body 5. To the hatch 8 is connected one end of a gas spring 9 the other end of which is connected to the body. This spring is usually mounted in the immediate vicinity of one side of the edge of the aperture, as is seen in FIG. 5.

The known weather strip for application to the rear aperture of a motor vehicle is usually formed with its tubular sealing section 4 connected to the anchoring section along substantially a longitudinal median line so that, on bending of the latter, the sealing section is connected to the convex face of the bottom of the channel formed by the anchoring section.

When the hatch 8 is opened or closed, the gas spring 9 rubs against the sealing section which is usually made up of cellular material. As a result of this rubbing, the tubular sealing section deteriorates very quickly. In order to avoid this disadvantage, the known weather strip can be made with the sealing section connected to the anchoring section along a longitudinal line which is displaced transversely relative to the longitudinal median line of the anchoring section, substantially as shown in FIGS. 1 and 2.

This weather strip should then be applied to the rear aperture so that the sealing section faces outwardly and is hence spaced from the body of the gas spring. This solution would overcome the disadvantage of the deterioration of the sealing section in the zone of rubbing with the body of the gas spring. However, it would have the disadvantages already described with reference to FIGS. 3 and 4 in the corner portions of the aperture.

Similar problems usually arise when there is an obstacle close to the edge to which the weather strip must be applied.

The object of the present invention is to provide a weather strip of the type specified at the beginning which allows the disadvantages of the prior art weather strips to be overcome.

This object is achieved according to the invention by means of a weather strip of the said type, the main characteristic of which lies in the fact that, in the portions of the weather strip intended to be applied to the said portions or critical zones of the edge, the sealing section is previously curved relative to the anchoring section and is connected to the anchoring section along a curved line.

A further object of the invention is to provide an extrusion head which allows a weather strip to be extruded with this characteristic.

Further characteristics and advantages of the invention will emerge from the detailed description which follows with reference to the appended drawings provided purely by way of non-limiting example, in which:

FIGS. 1 and 2, already described, show a weather strip according to the prior art;

FIGS. 3 and 4, already described, show a weather strip according to the prior art applied to a corner portion of the edge of an access aperture of a motor vehicle body;

FIG. 5, already described, shows a weather strip according to the prior art applied to the edge of a rear aperture of a motor car;

FIG. 9 shows a weather strip according to the invention applied to the aperture shown in FIG. 3;

FIG. 10 shows a critical portion of the edge of a rear aperture of a motor car, close to which there is an obstacle and to which a weather strip according to the invention is applied;

FIG. 11 shows a first embodiment of an extrusion head according to the invention for making a weather strip of the type shown in FIGS. 6 to 8;

Figure 6:
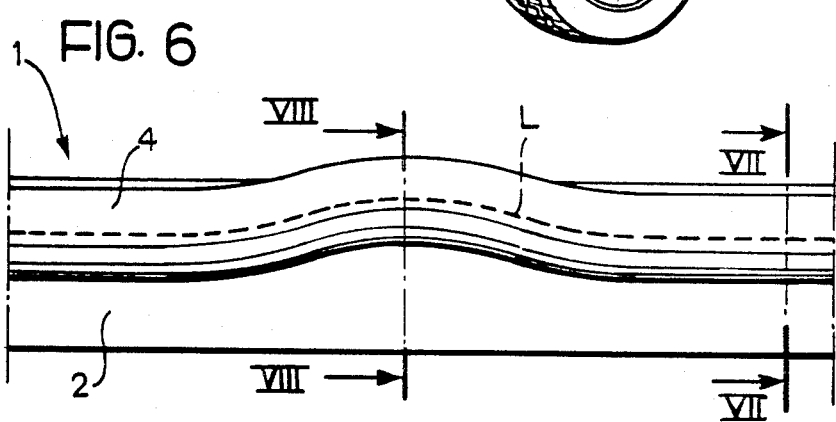
FIG. 6 shows a length of weather strip according to the invention.
Figure 7:
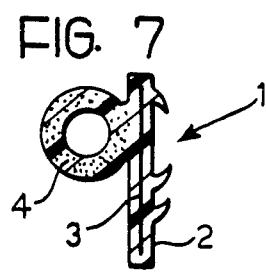
FIGS. 7 and 8 are sectional views of the weather strip of FIG. 6 taken on the lines VII—VII and VIII—VIII respectively of that Figure.
Figure 8:
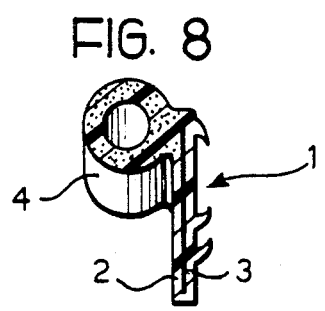

As is shown in FIG. 6, a weather strip 1 according to the invention comprises an anchoring section 2 of solid elastomeric material, formed substantially in accordance with the prior art, to which is connected a tubular sealing section 4 of cellular elastomeric material coextruded with the anchoring section 2. More particularly, according to the invention, the tubular sealing section 4 is curved relative to the anchoring section 2 in the portions of the weather strip 1 intended to be applied to corner portions of the edge of an aperture, and is connected to the section 2 along a curved line as shown by the broken line L in FIG. 6. In other words, in those portions of the weather strip intended to be applied to corner portions of an aperture, the tubular sealing section 4 is displaced transversely relative to the axis of the anchoring section 2 during the extrusion. Hence, in the weather strip according to the invention, the section of the portions intended to be applied to straight portions of an aperture are of the type shown in FIG. 7, that is, of substantially the same section as a weather strip of conventional type. In the portions intended to be applied to the corner portions of the aperture, however, the section of the weather strip according to the invention is of the type shown in FIG. 8, with the tubular section 4 displaced transversely relative to the axis of the anchoring section 2.

After extrusion, the anchoring section 2 of the weather strip shown in FIG. 6 is also bent into a channel shape, as occurs with weather strips of the conventional type. The weather strip is then applied to the edge of the aperture in such a manner that a curved section of the tubular sealing strip has its concavity facing the centre of curvature of the corner portion of the aperture.

FIG. 9 shows a portion of a similar aperture to that shown in FIG. 3, to which a length of weather strip of the type shown in FIG. 6 has been applied. The performed curvature of the tubular sealing section 4, formed according to the invention, is such that this sealing section is better adapted to the profile of the aperture in the zone of curvature, with a better functional result from the point of view of sealing and from the aesthetic point of view.

Figure 5:
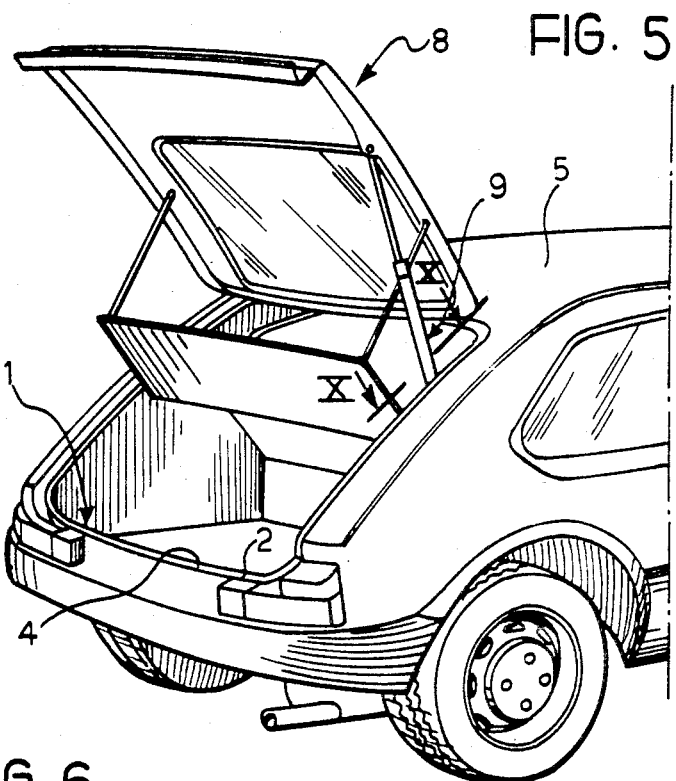

FIG. 10 shows a length of weather strip according to the invention applied to the edge of the rear aperture of the motor car shown in FIG. 5, close to the gas spring 9. As is seen from FIG. 10, adjacent the body of the gas spring 9, the tubular sealing section 4 is spaced from this body as a result of the curvature already formed during extrusion. Any possibility of deterioration of this sealing section is thus avoided.

Naturally, the sealing strip according to the invention can in general go around obstacles of various types, and not only obstacles constituted by a gas spring. The example of application shown in FIG. 10 is not limiting.

Figure 12:
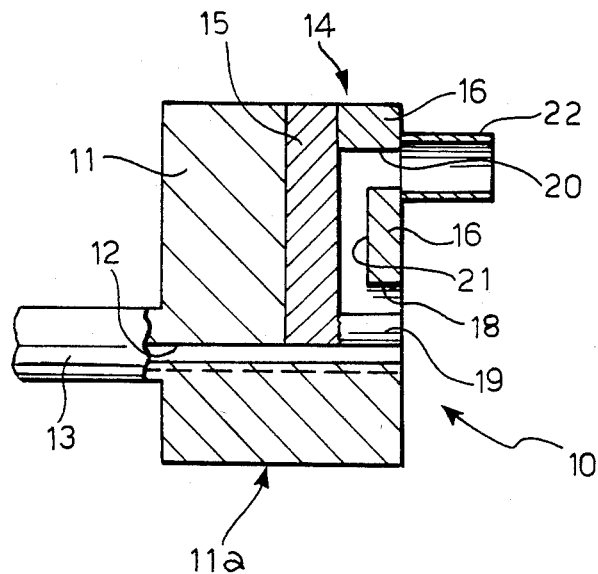
FIG. 12 is a cross-sectional view taken on the line XII—XII of FIG. 11.

FIGS. 11 and 12 show a first embodiment of an extrusion head adapted to allow the formation of the weather strip according to the invention.

In these Figures, an extrusion head, generally indicated 10, comprises a fixed body 11 which, in the example illustrated, is of substantially cylindrical form and has an axial extension 11a with a cross-section in the form of a chordal segment of a circle.

An aperture 12 of substantially rectangular cross section corresponding to the cross-section of the anchoring section of the weather strip is formed in the body 11. The upper wall of this aperture lies in the same plane as the upper flat face of the extension 11a of the body 11. A groove 12a in the form of a channel is formed in this extension and its walls constitute extensions of the side walls and bottom wall of the aperture 12.

To the end of the aperture 12 opposite the extension 11a of the body 11 is connected a duct 13 for supplying solid elastomeric material (in the direction of the arrow $F_1$ of FIG. 8) which forms the anchoring section 2 of the weather strip.

The extrusion head 10 further includes a movable body 14 essentially in the form of a chordal segment of a cylinder of a shape complementary to that of the extension 11a of the body 11. This movable body has a side projection 14a through which extend drive means of conventional type, not illustrated, operable to impart a translational movement in the direction indicated by the arrows $F_2$ in FIG. 11, that is, in a direction transverse the axis of the fixed body 11.

An almost circular, axial aperture 18 is formed in an element 16 and communicates axially with the groove 12a formed in the extension 11a of the fixed body 11. Within this aperture 18 extends a substantially cylindrical core 19 which may be fixed or formed integrally with an element 15. The core 19, together with the wall of the aperture 18, defines an annular passage of dimensions substantially corresponding to the cross-section of the tubular sealing section 4 of the weather strip to be formed. A through-hole 20 is also formed in the element 16 and extends parallel to the axis of the core 19. A duct 21 formed in the element 16 puts the aperture 20 in communication with the passage defined by the aperture 18 and the core 19. To the front face of the element 16, around the hole 20, is connected a duct 22 for supplying the cellular elastomeric material intended to form the tubular sealing section of the weather strip. This cellular elastomeric material is fed in the direction indicated by the arrow $F_3$ in FIG. 11. The material passes through the hole 20 and the duct 21, reaching the annular passage defined between the core 19 and the wall of the aperture 18.

From what has been explained above, it will be clear that, in operation, the form of the extrusion orifice of the head 10 may be modified by moving the movable body 14 in the direction of the arrows $F_2$. More particularly, by moving this movable body, it is possible to vary the position of the tubular sealing section of the weather strip relative to the axis of the anchoring section coextruded therewith.

Figure 13:
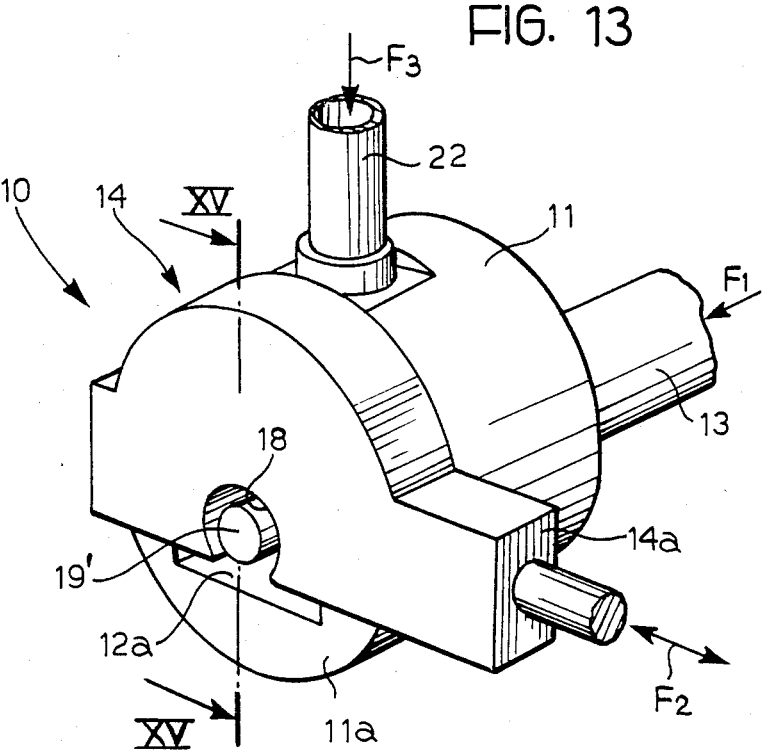
FIG. 13 is a perspective view of a variant of the extrusion head shown in FIG. 11.
Figure 14:
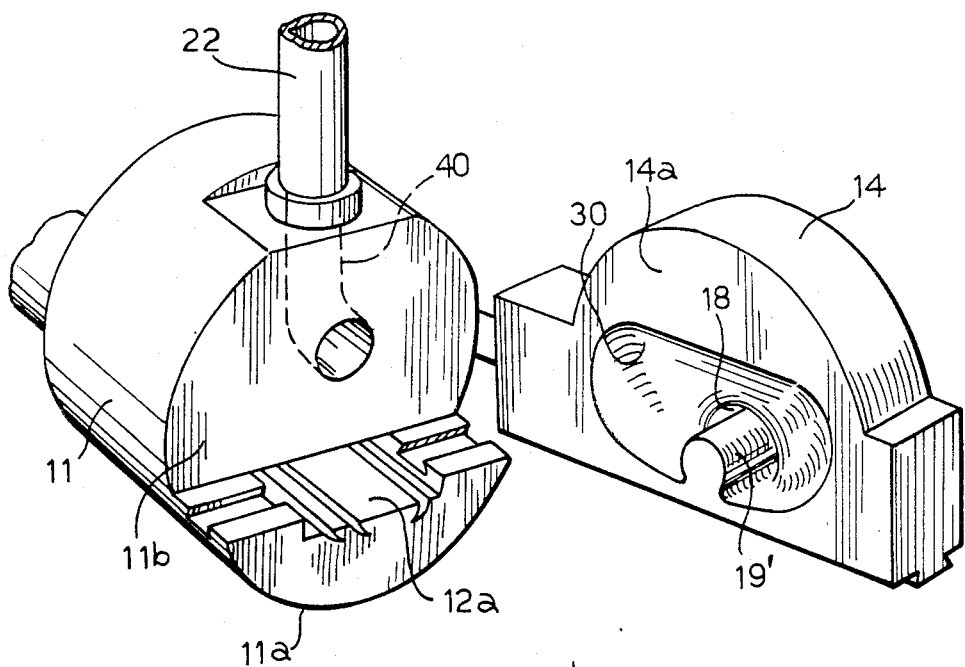
FIG. 14 is a partially-exploded, perspective view of the extrusion head shown in FIG. 13.
Figure 15:
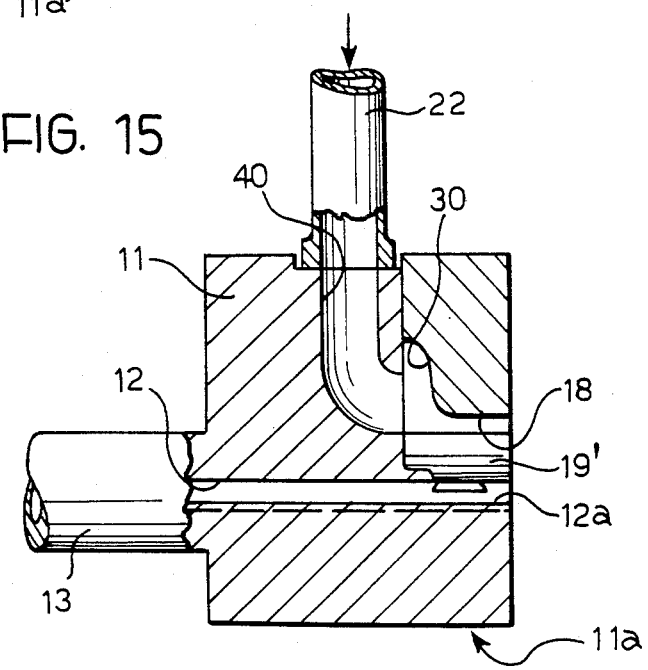
FIG. 15 is a cross-sectional view taken on the line XV—XV of FIG. 13.

FIGS. 13 to 15 show a variant of the extrusion head 10. In these Figures, those elements already described or having functions similar to those elements already described with reference to FIGS. 11 and 12 have been allotted the same reference numerals.

In this embodiment also, the extrusion head comprises a cylindrical body 1 having an extension 11a with a section in the form of a chordal segment of a circle. In this variant, the movable body 14 is constituted by a single element mounted for translational movement in the direction of the arrows $F_2$ of FIG. 11, for example, by means of a grooved coupling, on the flat upper face of the extension 11a of the body 11. As is seen from FIG. 12, a recess 30 is formed in the flat rear face of the movable element 14. The element 14, adjacent the flat lower face, has an almost circular aperture 18 into which extends a core 19' formed integrally with the movable body itself (FIGS. 13 and 14). Adjacent the front face, the lower part of the aperture 18 communicates with the groove 12a formed in the portion 11a of the fixed body 11 as an extension of the aperture 12 formed in the latter.

A duct 40 with an L-shaped path is formed in the fixed body 11 and connects an inlet aperture, which is formed in the peripheral surface of this fixed body and to which the duct 22 is connected, with an outlet aperture formed on the flat front face 11b of the fixed body. This outlet aperture opens into the recess 30 in the movable body 14. This recess has a width in the direction of displacement of the movable body 14 such that the outlet aperture of the duct 40 faces this recess in every operative position taken up by the movable body relative to the fixed body.

In operation, the cellular elastomeric material is fed through the duct 13, forced through the aperture 12 of the fixed body 11, and then along the groove 12a. Simultaneously, the cellular elastomeric material is fed through the duct 22 and reaches the recess 30 of the movable body 14 through the duct 40. This recess acts as a collecting chamber and conveys the elastomeric material towards the annular passage defined by the wall of the aperture 18 and the core 19'.

The position of the movable member 14 relative to the fixed body 11 being changed by drive means of conventional type, not illustrated, it is possible to move the tubular sealing section of the weather strip relative to the anchoring section.

Even though reference has been made in the illustrated examples to weather strips with a sealing section of flattened form (before bending), the invention clearly also extends to weather strips with anchoring sections with other cross-sections and to extrusion heads adapted to form such weather strips.

Furthermore, the invention is not intended to be limited to weather strips with tubular sealing sections of cellular material.

We claim

1. A weather strip for the edge of an aperture of the body of a motor vehicle or for the edge of a closure element of such an aperture, the weather strip comprising an anchoring section of elastomeric material and a tubular sealing section of elastomeric material coextruded with the anchoring section, the edge having critical zones for the application of the weather strip, such as, for example, corner portions or portions adjacent to which there is an obstacle: the tubular sealing section, in the portions of the strip intended to be applied to the critical zones of the edge, being curved relative to the anchoring section and connected to the anchoring section along a curved line.

2. An extrusion head for extruding a weather strip according to claim 1, the head having a first aperture shaped for the extrusion of the anchoring section and communicating with a second aperture in which is located a core which, with the wall of the second aperture, defines an annular passage for the extrusion of the tubular sealing section, and first and second ducts communicating with the first and the second apertures respectively for supplying the elastomeric material intended to form the anchoring section and the sealing section, respectively, the second aperture and the core being formed in a body which is movable relative to the first aperture in a direction at an angle to the outlet direction of the extruded material.

3. An extrusion head according to claim 2, wherein the movable body is formed with a duct communicating with the second aperture, and in that said second duct is connected to this duct.

4. An extrusion head according to claim 2, wherein the body is movable relative to the fixed part of the head between two extreme positions, and the movable body has a rear face sealingly slidable in contact with a front face of the fixed part of the head, a duct being formed in the fixed part and opening into the front face to supply the elastomeric material intended to form the sealing section: a cavity or chamber formed in the rear face of the movable body communicating with the second aperture and having, in the direction of displacement of the movable body, a dimension such that the duct faces the cavity or chamber in any position of the movable body between the extreme positions.

* * * * *